United States Patent [19]  
Zacharias, Jr.

[11] 4,365,518  
[45] Dec. 28, 1982

[54] FLOW STRAIGHTENERS IN AXIAL FLOWMETERS

[75] Inventor: Ellis M. Zacharias, Jr., Tulsa, Okla.

[73] Assignee: Mapco, Inc., Tulsa, Okla.

[21] Appl. No.: 236,932

[22] Filed: Feb. 23, 1981

[51] Int. Cl.³ .................................................. G01F 1/66
[52] U.S. Cl. ................................. 73/861.31; 73/861.28
[58] Field of Search ............ 73/861.27, 861.28, 861.31

[56] References Cited
U.S. PATENT DOCUMENTS 3,817,098  6/1974  Brown ............................... 73/861.28
4,144,752  3/1979  Lolk ................................... 73/861.28
4,325,262  4/1982  Meisser et al. .................... 73/861.28

Primary Examiner—Charles A. Ruehl
Attorney, Agent, or Firm—Head, Johnson & Stevenson

[57] ABSTRACT

An improved sonic flowmeter having a conduit with an inlet and outlet through which fluid flows for rate measurement, a portion of the conduit providing a linear flow path, a first and second spaced apart transducer element positioned to transmit and receive energy traveling through fluid as it traverses the linear flow path, circuitry connected to the transducer elements for detecting the speed of sound transmission between the transducer elements as an indication of the rate of fluid flow through the linear flow path, and dividers within the linear flow path separating the fluid stream into a plurality of reduced cross-sectional area streams, each providing a separate linear flow path through which sound is transmitted between the transducer elements providing means of increasing the linearity and repeatability of the detected rate of fluid flow.

8 Claims, 14 Drawing Figures

FLOW STRAIGHTENERS IN AXIAL FLOWMETERS

BACKGROUND OF THE INVENTION

1. Field of the Invention

This invention relates to ultrasonic flowmeters and more particularly to axial type flowmeters in which the rate of fluid flow is measured by transmitting sonic energy through a linear flow path.

2. Description of the Prior Art

A well-known means of measuring fluid flow is by the use of sonic energy. By transmitting sonic energy through a moving fluid stream, the rate of movement of the stream can be detected. Various arrangements are practiced for transmitting the sonic energy through the fluid stream. U.S. Pat. No. 2,991,650 shows various configurations of sonic flowmeters. A common method is to affix sonic transducers on opposite sides of a conduit and with one of the transducers being displaced downstream from the other. Sonic energy is thereby transmitted diagonally across the fluid stream and at an angle through the longitudinal axis of the fluid stream. This system has advantages of simplicity of installation; however, difficulty in obtaining a high degree of accuracy is experienced.

In order to increase the accuracy of ultrasonic flowmeters, a commonly employed system is to transmit the sonic energy from the first to a second transducer longitudinally along a linear flow path. One method is that the transducers are positioned centrally within an enlarged diameter conduit with the fluid flow passing around the first transducer, through the linear flow path, and around the second transducer. This system, which is described in U.S. Pat. No. 3,817,098, has disadvantages in that it requires the transducers to be positioned within the flow stream, making it difficult to replace and repair them. In addition, the transducers disturb the flow that is to be measured and are thereby a source of turbulence. Electrical conductors to the transducers must be brought out the sidewall of the flowmeter conduit.

Another commonly used method of employing linear flow paths in ultrasonic flowmeters is the use of the U-tube design illustrated in U.S. Pat. No. 2,991,650 and in an alternate arrangement in U.S. Pat. No. 3,575,049. In this design flow is diverted at the inlet through an angular bend, the flow then passing through an axial flow path to a second angular outlet. Transducers can then be affixed at each end of the flow path exteriorly of the bends. This system has the advantage that the transducers are removable without entering the flow stream, and connectors to the transducers do not have to pass through the flow stream conduit. A disadvantage, however, is that the turns required by the fluid stream introduces turbulence in the fluid flow path. This turbulence affects the speed of sound transmission in the fluid and causes non-linearity and non-repeatability in the sonic flow measurements. To overcome this problem, a standard technique has been to increase the length of the axial flow path, and many manufacturers provide flowmeters in which the length is fifteen or more times the diameter of the axial flow path. While the longer length of the flow path improves the performance of the axial type flowmeter, it has disadvantages within itself in that it makes the application of flowmeters more difficult; that is, in many piping arrangements there is not sufficient room to install a flowmeter which requires a long axial length of the flow path. Further, the use of long axial flow paths, such as fifteen times the diameter of the axial conduit, does not, within itself, serve to alleviate all of the turbulence. For this reason, even axial ultrasonic flowmeters having relatively long flow paths are not as accurate as is frequently desired.

It is an object of the present invention to overcome some of these problems and difficulties in the prior art of axial-type ultrasonic flowmeters by providing arrangements wherein the linearity and repeatability of the flowmeters are enhanced.

SUMMARY OF THE INVENTION

An improved sonic flowmeter is provided in this disclosure of the axial type, that is, wherein the speed of sound transmission is measured in a straight flow path. This flow path is normally obtained in a U-tube design, that is, wherein the flow inlet is diverted at an angle into the axial flow path and at the outlet end of the flow path, the flow is again diverted at an angle with the transducers for transmitting and receiving sound energy through the axial flow path being positioned at each end of the flow path. The sonic transducer elements transmit and receive sound energy through the fluid as it traverses the linear flow path. Electrical circuitry, of known design, is employed to originate the transmission of sonic energy, detect the sonic energy, measure the speed of transmission through the fluid, and provide an indication of the rate of fluid flow as a function of the speed of sound transmission through the fluid. Positioned within the flow stream are a plurality of dividers which serve to separate the axial flow stream into a plurality of reduced cross-sectional area separate flow streams, each of which is a linear path parallel to the linear path of all the other axial flow streams. The dividers may take the form of flat plates having the planes thereof parallel the flow path longitudinal axis or as a plurality of tubes, the tubular axis of each of which is parallel the longitudinal axis of the flow path. In one embodiment, the divider is in the form of a central tube having radially extending plates. In another embodiment a plurality of screens are positioned within the linear flow path, each of the screens being in a plane perpendicular the axial flow path.

DESCRIPTION OF THE VIEWS

DESCRIPTION OF THE PREFERRED EMBODIMENT

Figure 1:
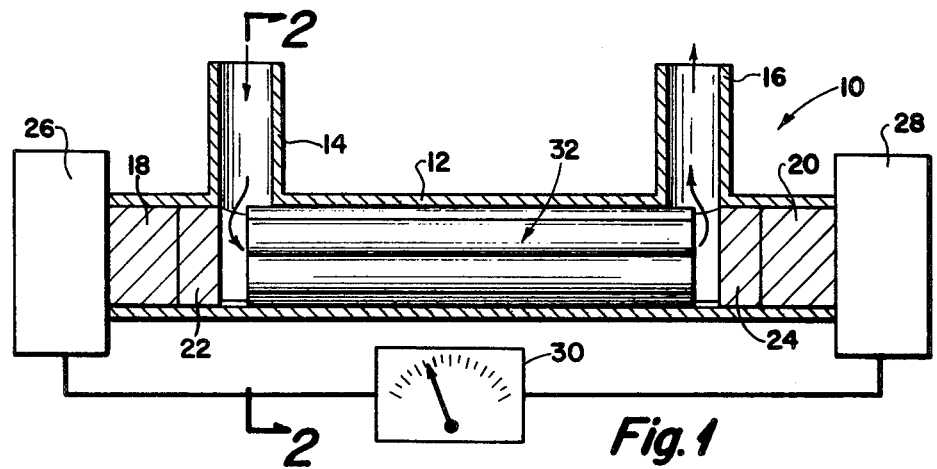
FIG. 1 is an elevational cross-section of a U-tube axial sonic flowmeter employing the principle of this invention wherein the linear flow path is separated into a plurality of reduced cross-sectional area axial flow paths.

Referring first to FIG. 1, an arrangement for practicing the invention is illustrated. An ultrasonic axial flowmeter is generally indicated by numeral 10 and includes a straight or linear conduit section 12 and, in communication with it, an inlet conduit 14 and outlet conduit 16. Fluid flows from inlet conduit 14 through linear section 12 and out conduit 16. The purpose of the meter 10 is to measure the rate of flow of the fluid in the linear conduit 12. If the rate of flow is known, then volumetric flow rate is easily computed since the conduit 12 has a known internal cross-sectional area.

To measure the rate of flow of fluid through the linear conduit section 12, a first transducer 18 is positioned adjacent the inlet conduit 14 and a second transducer 20 is positioned adjacent the outlet conduit 16. Sonic coupling members 22 and 24 serve to transmit sonic energy from or to the transducers 18 and 20 to the fluid flowing within the axial tube 12. The rate of fluid flow through the linear conduit 12 can be detected by measuring the speed of sound transmission through the fluid in a well-known manner. This can be accomplished by transducer 20 initiating bursts of sonic energy which are detected at transducer 18, that is, transmitting the sound in the direction opposite the fluid flow or the reverse procedure may be employed where sound is transmitted in the direction of fluid flow. In either manner, changes which occur in the speed of sound transmission are representative of the speed of fluid flow through the linear conduit section 12. Utilizing circuitry 26 and 28 for producing and receiving sonic energy and electronically detecting the speed of sound transmission, all of which are well known in the art and therefore not repeated herein, can be employed to provide an output at indicator 30 which may be calibrated to indicate the volumetric flow rate of fluid flowing through the meter. The output 30, of course, may be in analog or digital form and may be provided in the form of a print-out rather than a visual indication, all within the teachings of the art.

The apparatus described up to this point is a known method of utilizing an ultrasonic flowmeter of the axial flowtube type. As has previously been indicated, other geometrical arrangements are used for sonic flowmeters, but the axial flowtube type has advantages in that the sound is transmitted directly in the path of fluid flow through the axial flowtube 12 and thereby greater accuracy of measurement of the velocity of fluid flow can be made. However, a problem with the U-tube type axial flowmeter, as illustrated, is that the fluid flowing from inlet conduit 14 into the linear conduit section 12 makes an abrupt change of direction, generating turbulence. The turbulence is created in a like manner at the outlet end of the linear conduit section where the fluid must again change direction to pass out through outlet 16. This turbulence, which varies according to the flow velocity and with fluid viscosity, tends to cause ultrasonic axial flowmeters to be less linear than is desired, and the repeatability of measurements are not as great as would be desired. The purpose of this invention is to improve the linearity and repeatability of U-tube type axial flowmeters as shown in FIG. 1.

For this purpose divider means, generally indicated by numeral 32, is positioned within the linear conduit section 12. The purpose of the divider means is to separate the flow path within conduit 12 into a plurality of separate linear flow paths of reduced cross-sectional area. The streams of fluid flowing through these reduced cross-sectional area flow paths flow parallel to each other and parallel to the longitudinal axis of the linear conduit section 12. Sound transmitted from transducer 20 to transducer 18 passes in the fluid encompassed within these separate flow paths. The divider 32 serves to laminate the flow of fluid through the conduit 12 so that the turbulence of the fluid due to directional changes is substantially reduced.

Figure 2:
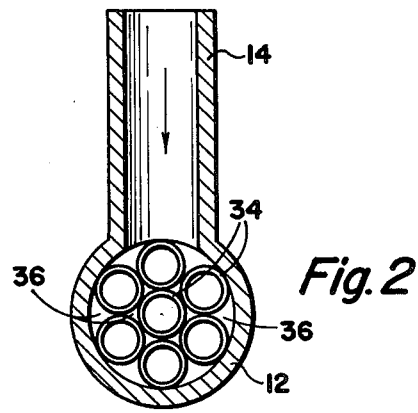
FIG. 2 is a cross-section taken along the line 2—2 of FIG. 1.

The arrangement of the divider 13 may take many forms illustrated in FIGS. 2 through 9 which are presented, not for the purpose of exhausting all possible concepts, but for illustrating typical divider arrangements. FIGS. 1 and 2 show the arrangement wherein seven small diameter thin wall tubes 34 are positioned within linear conduit 12. Fluid flows within the tubes 34 and, if not blocked off, in the areas 36 between the tubes. The axis of each tube 34 is parallel the longitudinal axis of linear conduit 12. Thus the longitudinal axis of each of the reduced cross-sectional area flow paths formed within and without tubes 34 is parallel the longitudinal axis of conduit 12. The arrangement of FIG. 2 provides thereby 19 separate linear flow paths of reduced cross-sectional area. Sound is transmitted in the fluid through each of these separate flow paths, and the resultant signal is representative of the average speed of sound transmission in these 19 flow paths.

Figure 3:
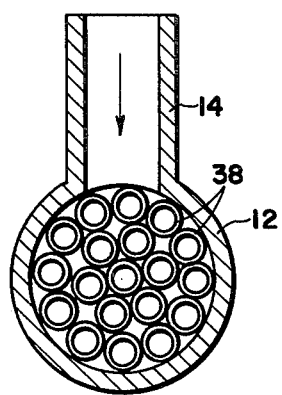
FIGS. 3–9 are cross-sectional views as shown in FIG. 2 but showing alternate embodiments of the invention in which the linear flow path is separated into a plurality of separate reduced cross-sectional area flow paths.
Figure 4:
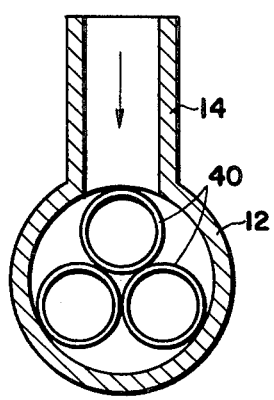
Figure 5:
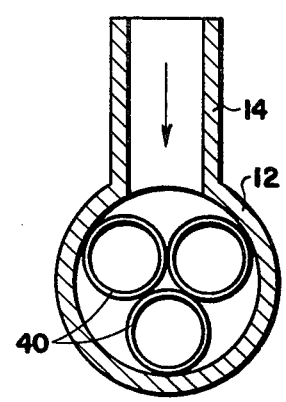

FIG. 3 shows essentially the same arrangement as FIG. 2 except that a number of smaller tubes 38 are utilized providing a larger number of separate linear flow paths of reduced cross-sectional area. FIGS. 4 and 5 show the arrangement wherein only three tubes 40 of larger diameter are employed and showing the possibility of different orientations of the tubes 40 within linear conduit 12. In all instances the tubular axis of the tubes 38 of FIG. 3 and 40 of FIGS. 4 and 5 are parallel the longitudinal axis of linear conduit 12.

Figure 6:
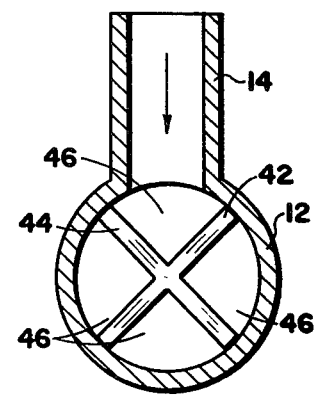
Figure 7:
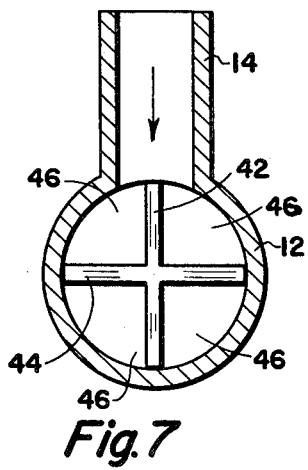
Figure 8:
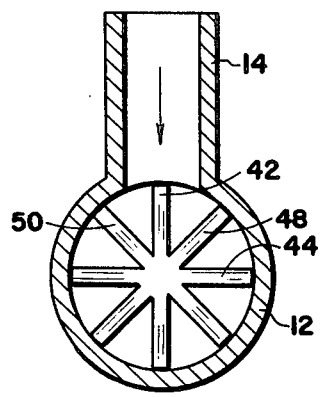

FIGS. 6, 7, and 8 show the arrangement wherein the divider means is in the form of plates. FIG. 7 shows a vertical plate 42 and horizontal plate 44 which are joined at their intersection. The planes of plates 42 and 44 are parallel the longitudinal axis of linear conduit 12. This arrangement provides four separate reduced cross-sectional area flow paths 46. The arrangement of FIG. 6 is the same as that of FIG. 7 except the plates 42 and 44 are displaced 45° from the vertical and horizontal.

FIG. 8 shows an embodiment in which, in addition to vertical plate 42 and horizontal plate 44, intermediate plates 48 and 50 are employed, dividing the interior of linear conduit 12 into eight reduced cross-sectional area linear flow paths.

Figure 9:
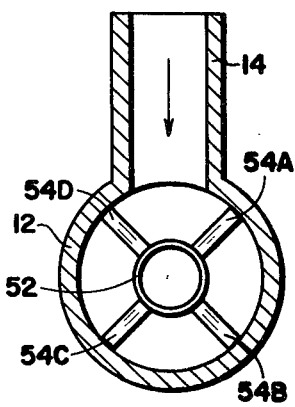

FIG. 9 shows the use of a combination of a tube and plates, having a central tube 52, the tubular axis of which is coincident with the tubular axis of the linear conduit 12. Affixed to the outer periphery of tube 52 are four fins 54A through 54D which extend radially from the tube. The plane of each of the fins 54A through 54D is parallel the axis of linear conduit 12 dividing the interior of the conduit into five separate reduced cross-sectional area flow paths.

The arrangements illustrated in FIGS. 2 through 9 are merely exemplary of a wide variety of different ways in which a plurality of reduced cross-sectional area flow paths may be arranged in the linear section of a U-tube axial flowmeter to provide improve laminar flow to thereby reduce turbulence of the fluid flow and to improve the accuracy and repeatability of ultrasonic flowmeters.

Figure 10:
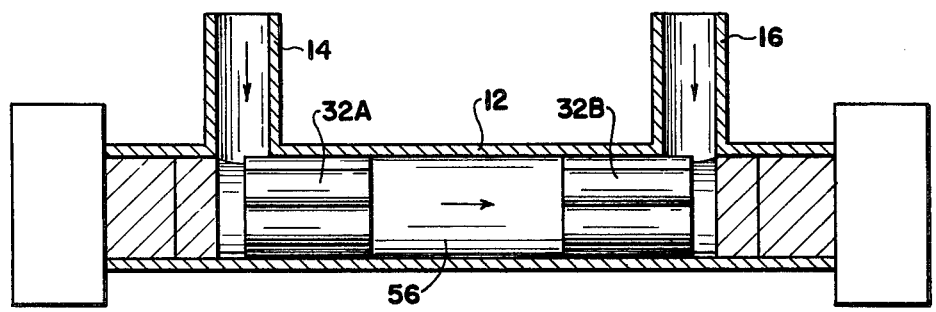
FIG. 10 is an elevational cross-sectional view of a U-tube type axial sonic flowmeter as in FIG. 1 but showing an alternate embodiment wherein the partition members are divided into a first and second set, one set being positioned adjacent the axial flow path inlet and the other adjacent the axial flow path outlet.

The primary cause of turbulence in U-tube type flowmeters is the change of direction which must take place between the inlet and outlet conduits as the fluid enters into and leaves the axial conduit section 12 where flow measurement takes place. FIG. 10 illustrates an arrangement wherein the dividers positioned within the axial conduit 12 are of relatively short length and are separated into two sections, that is, an inlet section 32A adjacent the inlet conduit 14, and an outlet section 32B adjacent the outlet conduit 16. A cross-sectional configuration of the reduced length divider sections 32A and 32B may be the same as any of those illustrated in FIGS. 2–9, or any variation or equivalent of these cross-sectional arrangements. Between the divider sections 32A and 32B is an intermediate space 56 in which there are no dividers and in which the fluid flows in the full interior of linear conduit section 12. The advantage of the arrangement of FIG. 10 over that of FIG. 1 is that less material is required and the pressure drop imposed by the slight increase in flow restrictions imparted by the use of dividers is somewhat reduced. It can be seen that instead of only two divider sections 32A and 32B, the arrangement wherein there are three, four, or any number of sets of dividers with space between them may be employed.

When designing improved U-tube axial flowmeters employing the use of dividers as illustrated herein, it is preferable to use as large a number of dividers as permissible to thereby increase the lamination of the fluid flow, but at the same time other design factors must be taken into consideration. When using tubes such as illustrated in FIGS. 2, 3, 4, 5, and 9, the tube diameter must be sufficiently large with respect to the ultrasonic wave length so that the ultrasonic pressure wave is propagated through each tube without substantial distortion. In addition, the wall thicknesses of the tubes and plate dividers need to be small in order not to create unnecessary pressure drop and also should be small in relationship to the ultrasonic wave length so that the presence of the dividers does not substantially attenuate or distort the ultrasonic pressure waves.

Figure 11:
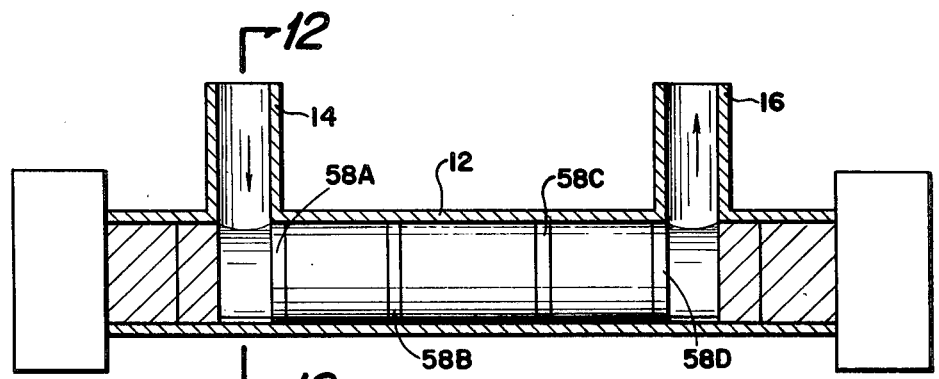
FIG. 11 is an elevational cross-sectional view of a U-tube type axial sonic flowmeter as shown in FIG. 1 but showing an alternate embodiment wherein the means within the flow path of separating the fluid stream into a plurality of reduced cross-sectional streams includes a plurality of screen members.
Figure 12:
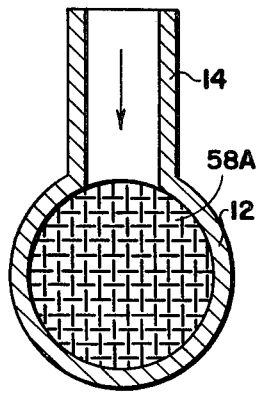
FIG. 12 is a cross-sectional view taken along the line 12—12 of FIG. 11.
Figure 13:
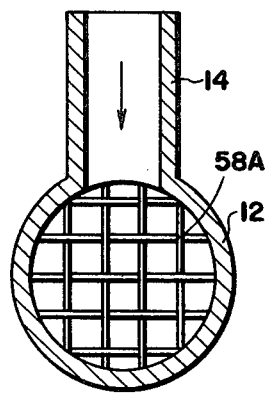
FIG. 13 is a cross-sectional view as shown in FIG. 12 showing an embodiment in which the screen is of a lower number mesh.

FIGS. 11, 12 and 13 show an alternate embodiment of the invention. In this arrangement instead of dividers in the form of tubes or plates, a plurality of screens 58A through 58D are positioned within the linear conduit section 12. Each of the screens 58A to 58D is in a plane perpendicular the longitudinal axis of the linear conduit section 12. As shown in FIGS. 12 and 13, the mesh of the screens is variable with FIG. 12 showing a higher numbered mesh screen compared to FIG. 13. FIG. 11 shows the use of four screens spaced apart from each other within the axial conduit section 12; however, it is apparent that any number may be employed with two being considered the minimum, that is, one adjacent the inlet and one adjacent the outlet of the linear conduit. The word "screen" as used herein includes other similar devices such as any wire mesh arrangement or perforated plates which serve to separate the fluid flow into a large number of small cross-sectional areas as fluid passes through the screens to break up turbulence and assist in straightening the flow through the interior of conduit 12.

Figure 14:
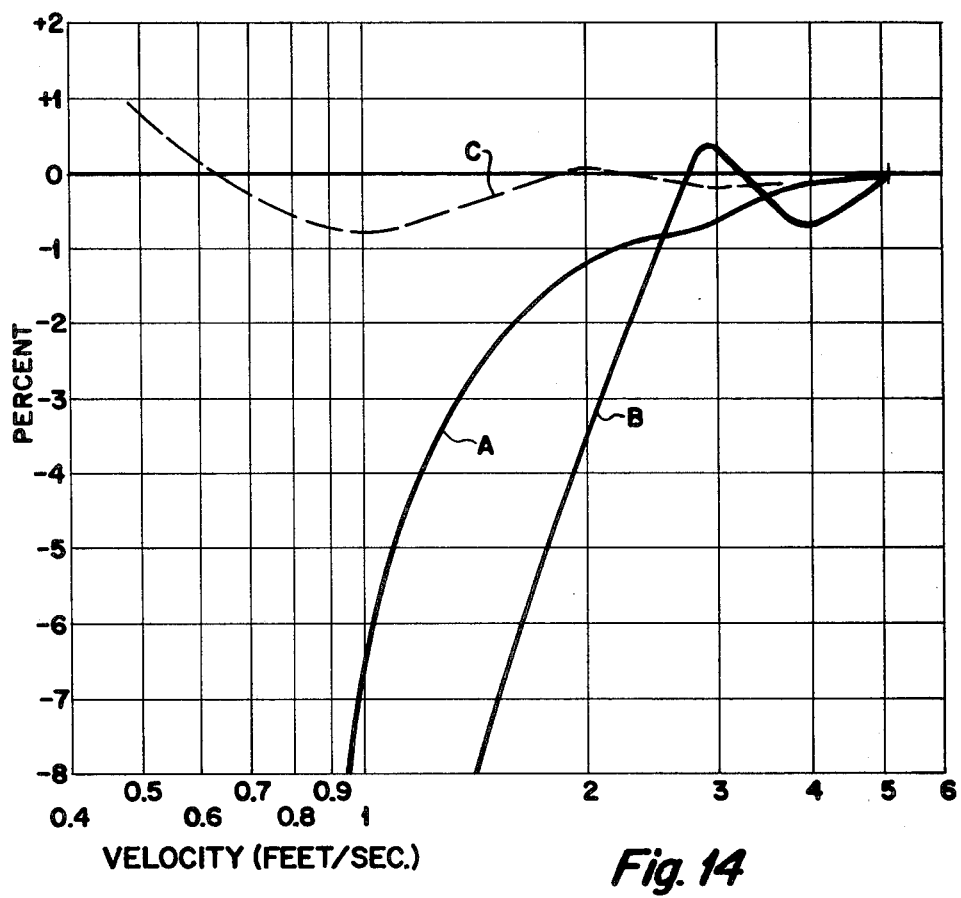
FIG. 14 is a graph comparing the percentage of departure from the actual flow rate of the detected flow rate of a U-tube axial sonic flowmeter showing two measurements made without the improvements of this invention in solid line, and, in dotted line, a measurement made employing the improvement of this invention.

FIG. 14 is a graph which compares the relative meter factor as the ordinate versus flow rate as the abscissa of one U-tube type axial sonic flowmeter. The ordinate indicates percentage of meter accuracy plus and minus from zero, zero being indicative of correct meter accuracy, that is, wherein the indicated flow rate is exactly equal to the actual flow rate. Percentage above zero indicate the meter has indicated more flow than has actually taken place whereas below the horizontal zero line indicates that the meter has indicated a percentage amount below the actual flow rate. The abscissa is a logarithmic scale in velocity of fluid flow in feet/per/second. The graph A is the curve plotted from various flow rates from approximately 0.5 to approximately 5 feet/per/second of a U-tube axial sonic flowmeter without flow straighteners. Curve B is another graph of the same U-tube axial sonic flowmeter, both curve A and B being derived when no flow dividers were used. The circumstances of graphs A and B were identical, and the difference in the curves A and B are indicative of the problem of repeatability of U-tube flowmeters. Further, the large departures of the relative meter factor is illustrative of the inaccuracy of the meter. Curve C is a plot of the relative meter factor versus flow rate of the same U-tube axial sonic flowmeter wherein seven small diameter tubes were employed as illustrated in FIGS. 1 and 2. This illustrates how the accuracy of the flowmeter is dramatically improved since in this test the measurements of the actual flow rate for fluid velocities between 0.5 and 5 feet/per/second did not depart more than 1% plus or minus from the actual flow rate.

The graph of FIG. 14 is that for a standard ½ inch axial flowmeter and is not given for the purpose of indicating the results which would necessarily be obtained with any other flowmeter or under any other conditions but is given only as illustrative of the improvements in accuracy and repeatability which can be obtained by employing the principles of this invention.

While the invention has been described with a certain degree of particularity, it is manifest that many changes may be made in the details of construction and the arrangement of components without departing from the spirit and scope of this disclosure. It is understood that the invention is not limited to the exemplified embodiments set forth herein but is to be limited only by the scope of the attached claim or claims, including the full range of equivalency to which each element thereof is entitled.

What is claimed is:

1. An improved sonic flowmeter comprising:
   a conduit having an inlet and outlet through which fluid flows for flow rate measurement, a portion of the conduit providing a linear flow path;
   first and second spaced apart sonic transducer elements positioned to transmit and receive sound energy travelling through fluid as it traverses said conduit linear flow path;
   means for detecting the speed of sound transmission between said transducer elements as an indication of the rate of fluid flow through said linear flow path; and a means within said linear flow path of separating the fluid stream into a plurality of reduced cross-sectional area streams, each providing a separate linear flow path through which sound is transmitted between said transducer elements.

2. An improved sonic flowmeter according to claim 1 in which said means within said linear flow path of dividing the fluid stream into a plurality of reduced cross-sectional area streams includes at least one partition member having a linear longitudinal axis parallel the longitudinal axis of the fluid flow path.

3. An improved sonic flowmeter according to claim 2 wherein said partition members are in the form of a plurality of small diameter linear conduits, the axis of each being parallel the flow path axis.

4. An improved sonic flowmeter according to claim 2 wherein said partition members are divided into first and second sets positioned adjacent the ends of said linear flow path providing a space within the flow path between the sets of dividers.

5. An improved sonic flowmeter according to claim 2 wherein said dividers are in the form of flat, elongated, thin plates, the plane of each plate being parallel the flow path longitudinal axis.

6. An improved sonic flowmeter according to claim 5 in which said flat divider plates intersect each other.

7. An improved sonic flowmeter according to claim 2 wherein said partitions are in the form of a central reduced diameter tube coaxial with the flow path, and a plurality of radially extending flat fins attached to the outer circumferential surface of the central tube, the plane of each flat fin being parallel the flow path longitudinal axis.

8. An improved sonic flowmeter according to claim 1 in which said means within said linear flow path of dividing the fluid stream into a plurality of reduced cross-sectional streams includes a plurality of screen members, the plane of each screen being perpendicular the longitudinal flow path axis, the screen members being spaced apart from each other within the flow path.

* * * * *